US012418757B2

(12) United States Patent
Milne et al.

(10) Patent No.: US 12,418,757 B2
(45) Date of Patent: Sep. 16, 2025

(54) HEARING AID PROXIMITY DETECTION AND ACTION TO OPTIMIZE A CALL

(71) Applicant: Sony Group Corporation, Tokyo (JP)

(72) Inventors: James R. Milne, Romona, CA (US); William Clay, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 266 days.

(21) Appl. No.: 18/119,481

(22) Filed: Mar. 9, 2023

(65) Prior Publication Data

US 2024/0305936 A1 Sep. 12, 2024

(51) Int. Cl.
*H04R 25/00* (2006.01)

(52) U.S. Cl.
CPC ....... *H04R 25/552* (2013.01); *H04R 2225/55* (2013.01)

(58) Field of Classification Search
None
See application file for complete search history.

(56) References Cited

U.S. PATENT DOCUMENTS

| | | | | |
|---|---|---|---|---|
| 9,942,670 | B2 | 4/2018 | Dickel et al. | |
| 11,146,898 | B2 * | 10/2021 | Neumeyer | H04R 25/554 |
| 2009/0154742 | A1 * | 6/2009 | Rasmussen | H04R 25/453 381/312 |
| 2021/0058105 | A1 * | 2/2021 | Landry | H04W 12/08 |

FOREIGN PATENT DOCUMENTS

| | | | |
|---|---|---|---|
| CH | 708609 | A2 | 4/2015 |

* cited by examiner

*Primary Examiner* — Paul W Huber
(74) *Attorney, Agent, or Firm* — Trellis IP Law Group, PC

(57) ABSTRACT

A first hearing aid includes a first sensor that receives first sensor data associated with a mobile device. The first hearing aid determines, based on the first sensor data, that a first distance between the first hearing aid and the mobile device is below a first distance threshold. The first hearing aid changes a first preset associated with the first hearing aid to a second preset. A second hearing aid changes a first preset associated with the second hearing aid to a third preset.

13 Claims, 6 Drawing Sheets

HEARING AID PROXIMITY DETECTION AND ACTION TO OPTIMIZE A CALL

BACKGROUND

Due to cost constraints, some hearing aids cannot connect to a mobile phone via Bluetooth or WiFi. As a result, the hearing aids are unable to determine when a mobile phone is near the hearing aid. Hearing aids have different presets based on particular situations. For example, the presets for when a hearing aid is detecting noise in a room is different than the presets for when a hearing aid is used to detect noise emitted from a mobile phone that is next to the user's ear.

SUMMARY

A computer-implemented method includes receiving, at a first sensor associated with a first hearing aid, first sensor data associated with a mobile device. The method further includes determining, based on the first sensor data, that a first distance between the first hearing aid and the mobile device is below a first distance threshold. The method further includes changing a first preset associated with the first hearing aid to a second preset. The method further includes changing a first preset associated with a second hearing aid to a third preset.

In some embodiments, the first preset associated with the first hearing aid is an ambient noise setting and the second preset is a mix of ambient noise and noise cancellation that amplifies voices and reduces background noise. In some embodiments, the first preset associated with the first hearing aid includes a far-field microphone setting and the second preset includes a near-field microphone setting. In some embodiments, the method further includes receiving, at a second sensor associated with the second hearing aid, second sensor data associated with the mobile device and determining, based on the second sensor data, that a second distance between the second hearing aid and the mobile device exceeds the first distance threshold and is below a second distance threshold, wherein changing the first preset associated with the second hearing aid occurs responsive to the determining. In some embodiments, the first preset associated with the second hearing aid is an ambient noise setting and the third preset is noise cancellation. In some embodiments, the method further includes determining that the first distance between the first hearing aid and the mobile device meets the first distance threshold and changing the second preset associated with the first hearing aid to the first preset. In some embodiments, the method further includes determining that the second distance between the second hearing aid and the mobile device is below the first distance threshold and changing the third preset associated with the second hearing aid to the second preset. In some embodiments, first sensor is selected from the group of an ultrasonic sensor, radar, an inductive proximity sensor, a photoelectric sensor, and combinations thereof.

A system includes a first hearing aid that includes one or more first processors and first logic encoded in one or more first non-transitory media for execution by the one or more first processors and when executed operable to: receive first sensor data associated with a mobile device, determine, based on the first sensor data, that a first distance between the first hearing aid and the mobile device is below a first distance threshold, and change a first preset associated with the first hearing aid to a second preset. The system further includes a second hearing aid that includes one or more second processors and second logic encoded in one or more second non-transitory media for execution by the one or more first processors and when executed operable to change a first preset associated with a second hearing aid to a third preset.

In some embodiments, wherein the first preset associated with the first hearing aid is an ambient noise setting and the second preset is a mix of ambient noise and noise cancellation that amplifies voices and reduces background noise. In some embodiments, the first preset associated with the first hearing aid includes a far-field microphone setting and the second preset includes a near-field microphone setting. In some embodiments, the second logic is further operable to: receive second sensor data associated with the mobile device and determine based on the second sensor data, that a second distance between the second hearing aid and the mobile device exceeds the first distance threshold and is below a second distance threshold, wherein changing the first preset associated with the second hearing aid occurs responsive to the determining. In some embodiments, the first preset associated with the second hearing aid is an ambient noise setting and the third preset is noise cancellation. In some embodiments, the second logic is further operable to: determine that the second distance between the second hearing aid and the mobile device is below the first distance threshold and change the third preset associated with the second hearing aid to the second preset.

Software encoded in one or more non-transitory computer-readable media for execution by the one or more processors and when executed is operable to: receive, at a first sensor associated with a first hearing aid, first sensor data associated with a mobile device; determine, based on the first sensor data, that a first distance between the first hearing aid and the mobile device is below a first distance threshold; change a first preset associated with the first hearing aid to a second preset; and change a first preset associated with a second hearing aid to a third preset. In some embodiments, the first preset associated with the first hearing aid is an ambient noise setting and the second preset is a mix of ambient noise and noise cancellation that amplifies voices and reduces background noise. In some embodiments, the first preset associated with the first hearing aid includes a far-field microphone setting and the second preset includes a near-field microphone setting. In some embodiments, the software is further operable to: receive, at a second sensor associated with the second hearing aid, second sensor data associated with the mobile device and determine, based on the second sensor data, that a second distance between the second hearing aid and the mobile device exceeds the first distance threshold and is below a second distance threshold, wherein changing the first preset associated with the second hearing aid occurs responsive to the determining. In some embodiments, the first preset associated with the second hearing aid is an ambient noise setting and the third preset is noise cancellation.

As a result of the techniques described below, the hearing aids advantageously change the presets for the hearing aids when the mobile device is within proximity without requiring a Bluetooth connection. The hearing aids are able to avoid feedback and control for loudness during phone calls.

A further understanding of the nature and the advantages of particular embodiments disclosed herein may be realized by reference of the remaining portions of the specification and the attached drawings.

DETAILED DESCRIPTION OF EMBODIMENTS

Example Environment 100

Figure 1:
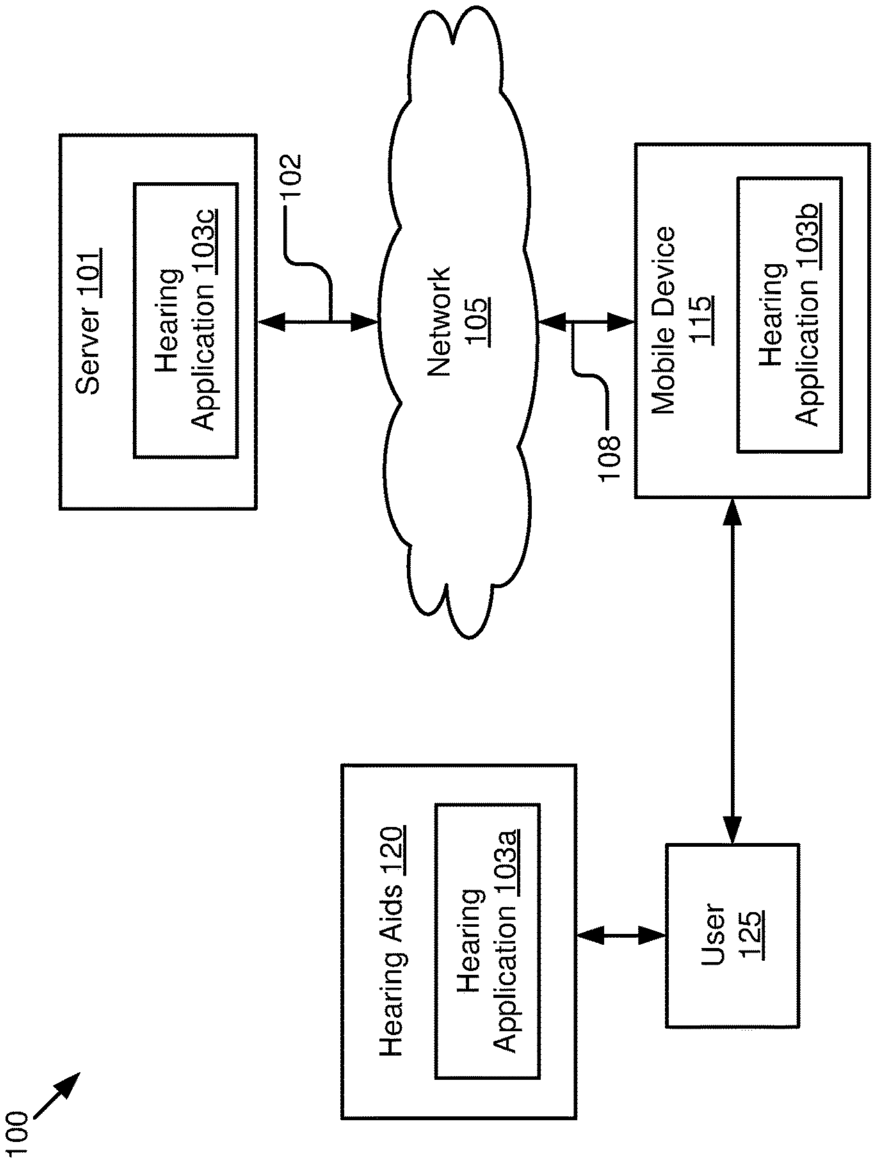
FIG. 1 is a block diagram of an example environment according to some embodiments described herein.

FIG. 1 illustrates a block diagram of an example environment 100. In some embodiments, the environment 100 includes hearing aids 120, a mobile device 115, and a server 101. A user 125 is associated with the mobile device 115 and the hearing aids 120. In some embodiments, the environment 100 may include other servers or devices not shown in FIG. 1. In FIG. 1 and the remaining figures, a letter after a reference number, e.g., "103*a*," represents a reference to the element having that particular reference number (e.g., a hearing application 103*a* stored on the mobile device 115). A reference number in the text without a following letter, e.g., "103," represents a general reference to embodiments of the element bearing that reference number (e.g., any hearing application).

The hearing aids 120 may include a processor, a memory, a microphone, and a speaker. The hearing aids 120 may include two hearing aids, such as a hearing aid for the left ear and a hearing aid for the right ear. The hearing aids 120 may be in-ear hearing aids or external hearing aids. More specifically, the hearing aids 120 may include devices that are invisible in the canal, completely in the canal, in the canal, half shell, full shell, behind the ear, or other variations.

In some embodiments, the hearing aids 120 includes a hearing application 103*a* that performs hearing tests. For example, the user 125 may be asked to identify sounds emitted by speakers of the hearing aids 120 and the user may provide user input, for example, by pressing a button on the hearing aids 120 or by interacting with the mobile device 115.

In some embodiments, the hearing aids 120 communicate with a hearing application 103*b* stored on the mobile device 115. During testing, the hearing aids 120 receive instructions from the mobile device 115 to emit test sounds at particular decibel levels. In some embodiments, the instructions are provided in the form of high-frequency chirps emitted by the mobile device 115. The user may be asked to identify on a user interface generated by the mobile device 115 when they hear sounds generated by each of the hearing aids 120. Once testing is complete, the hearing aids 120 store a hearing profile that includes instructions for how to modify sound based on different factors, such as frequencies, types of sounds, etc. In some embodiments, the hearing aids 120 also store one or more presets, such as a first preset that includes an ambient noise setting and a far-field microphone setting, a second preset that includes a mix of ambient noise and noise cancellation and a near-field microphone setting, and a third preset that includes noise cancellation.

The hearing application 103*a* on the hearing aids 120 determines when to switch between presets. A sensor associated with the first hearing aid 120*a* receives sensor data associated with a mobile device 115. The sensor may include an ultrasonic sensor, radar, an inductive proximity sensor, a photoelectric sensor, or a combination of any of those sensors. The hearing application 103*a* determines that a first distance between the mobile device 115 and the first hearing aid 120*a* is below a first distance threshold. The hearing application 103*a* changes a first preset associated with the first hearing aid 120*a* to a second preset. For example, the first preset is an ambient noise setting and the second preset is a mix of ambient noise and noise cancellation.

In some embodiments, a sensor associated with the second hearing aid 120*b* determines, based on the sensor data, that a second distance between the mobile device 115 and the second hearing aid 120*b* exceeds the first distance threshold and is below a second distance threshold. The hearing application 103*a* changes a first preset associated with the second hearing aid 120*b* to a third preset. For example, the first preset is an ambient noise setting and the third preset is noise cancellation. As a result, the user 125 is able to hear sounds from the mobile device 115 more clearly with the first hearing aid 120*a* based on the second preset and noise is blocked from the second hearing aid 120*b* based on the third preset.

The mobile device 115 may be a computing device that includes a memory, a hardware processor, and a hearing application 103*b*. The mobile device 115 may include a smart phone, a mobile telephone, a tablet computer, a wearable device (e.g., a smart watch), a mobile email device, or another electronic device capable of accessing a network 105 to communicate with the server 101 and capable of communicating with the hearing aids 120.

In the illustrated implementation, mobile device 115 is coupled to the network 105 via signal line 108. Signal line 108 may be a wired connection, such as Ethernet, coaxial cable, fiber-optic cable, etc., or a wireless connection, such as Wi-Fi®, Bluetooth®, or other wireless technology. The mobile device 115 is used by way of example. While FIG. 1 illustrates one mobile device 115, the disclosure applies to a system architecture having one or more mobile devices 115.

The hearing application 103*b* on the mobile device 115 may implement hearing tests and generate a hearing profile based on the hearing test. In some embodiments, the hearing application 103*b* implements the hearing tests through a series of high-frequency chirps that are received by the hearing aids 120.

The server 101 may include a processor, a memory, and network communication hardware. In some embodiments, the server 101 is a hardware server. The server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology.

In some embodiments, the server 101 includes a hearing application 103*c*. In some embodiments and with user consent, the hearing application 103*c* on the server 101 maintains a copy of the hearing profile and the presets.

Example Computing Device 200

Figure 2:
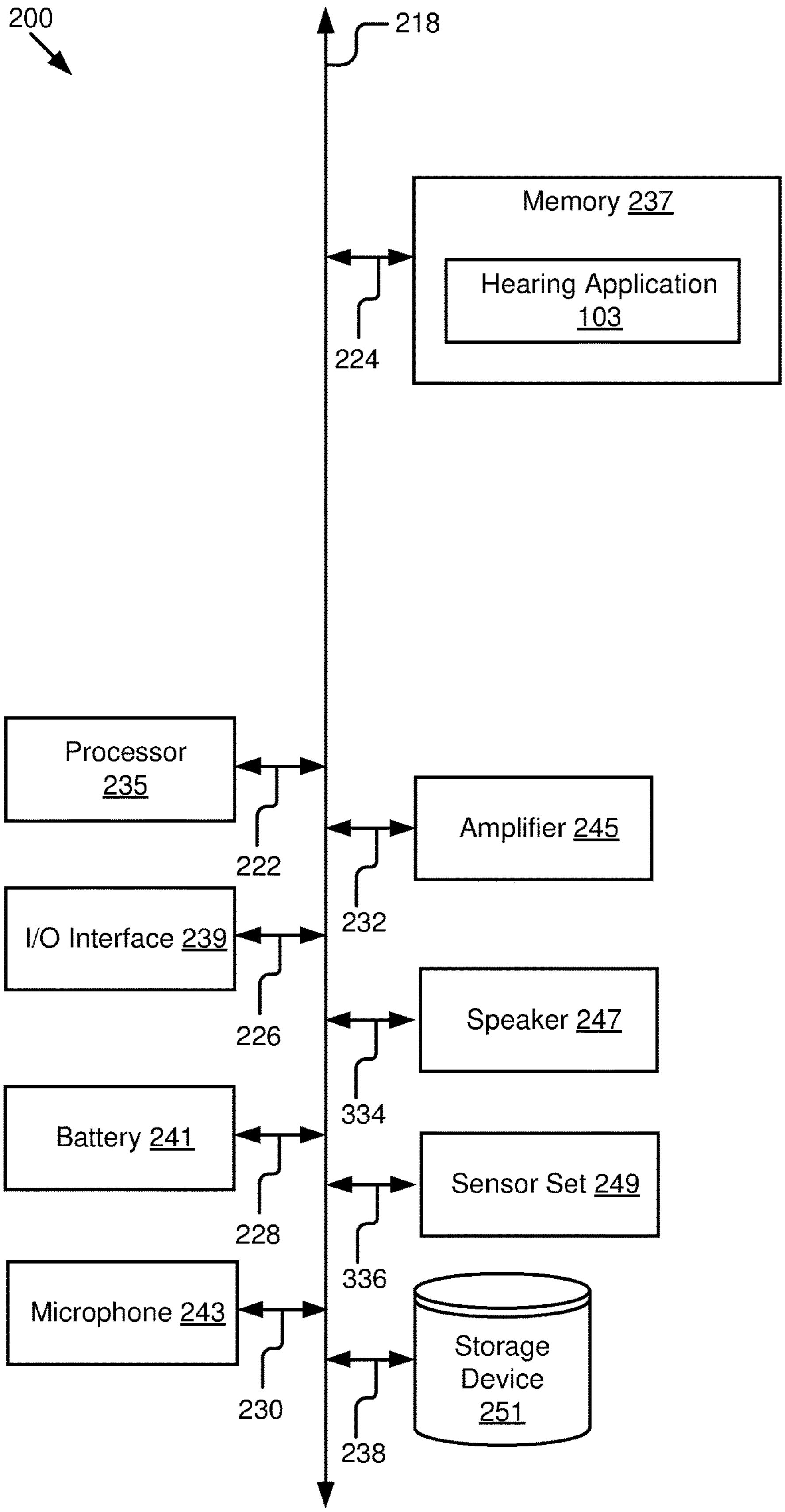
FIG. 2 is a block diagram of an example computing device according to some embodiments described herein.

FIG. 2 is a block diagram of an example computing device 200 that may be used to implement one or more features described herein. The computing device 200 can be any suitable computer system, server, or other electronic or hardware device. In one example, the computing device 200 includes the hearing aids 120 illustrated in FIG. 1.

In some embodiments, computing device 200 includes a processor 235, a memory 237, an Input/Output (I/O) interface 239, a battery 241, a microphone 243, an amplifier 245, a speaker 247, a sensor set 249, and a storage device 251. Although particular components of the computing device 200 are illustrated, other components may be added or removed.

The processor 235 may be coupled to a bus 218 via signal line 222, the memory 237 may be coupled to the bus 218 via signal line 224, the I/O interface 239 may be coupled to the bus 218 via signal line 226, the battery 241 may be coupled to the bus 218 via signal line 228, the microphone 243 may be coupled to the bus 218 via signal line 230, the amplifier 245 may be coupled to the bus 218 via signal line 232, the speaker 247 may be coupled to the bus 218 via signal line 334, the sensor set 249 may be coupled to the bus 218 via signal line 336, and the storage device 251 may be coupled to the bus 218 via signal line 338.

The processor 235 can be one or more processors and/or processing circuits to execute program code and control basic operations of the computing device 200. A processor includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems. A computer may be any processor in communication with a memory.

The memory 237 is typically provided in computing device 200 for access by the processor 235 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including the hearing application 103.

The I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., the memory 237 or the storage device 251), and input/output devices can communicate via I/O interface 239. In some embodiments, the I/O interface 239 can connect to interface devices such as input devices (keyboard, pointing device, touchscreen, microphone, sensors, etc.) and/or output devices (display 341, speakers, etc.).

The battery 241 includes hardware for providing energy to the computing device. In some embodiments, the battery 241 may include one or more disposable batteries where the batteries are different depending on the type of hearing aid. For example, behind-the-ear hearing aids may take size 675 batteries and mini-behind-the-ear hearing aids may use 312 batteries. The size of the batteries may also be a compromise between power, length of charge, and weight. In some embodiments, the battery 241 may be a rechargeable battery.

The microphone 243 includes hardware for detecting sounds. For example, the microphone 243 may detect ambient noises, people speaking, music, etc. The microphone 243 converts the detected sounds to an electrical signal that is transmitted to the amplifier 245 via the I/O interface 239. In some embodiments, the microphone 243 includes different settings, such as far-field detection and near-field detection.

The amplifier 245 includes hardware for modifying portions of the electrical signal based on instructions received from the hearing application 103 via the I/O interface 239 to amplify, reduce, or block certain sounds based on the applicable preset. For example, the hearing application 103 may instruct the amplifier 245 to amplify voices by increasing the gain and reduce sounds from ambient noise by reducing the gain of the amplifier according to a preset that is used when the user is using their mobile device for a phone call.

The speaker 247 includes hardware for receiving the electrical signal from the amplifier 245 and converting the electrical signal into sound waves that are output for the user to hear. For example, the speaker 247 may include a digital to analog converter that converts the electrical signal to sound waves.

The sensor set 249 includes one or more of an ultrasonic sensor, radar, an inductive proximity sensor, a photoelectric sensor, or other sensors that generate sensor data that is transmitted to the hearing application 103 via the I/O interface 239 to determine the proximity of a mobile device. The sensors in the sensor set 249 may be selected based on balancing the demands of cost, size, performance, amount of digital signal processor (DSP) processing available (i.e., the amount of resources for processing audio that are available), and the amount of central processing unit (CPU) performance available.

An ultrasonic sensor can be used to measure a distance to an object using ultrasonic sound waves. In some embodiments, the ultrasonic sensor emits high-frequency sound waves. When the high-frequency sound waves hit an object, the sound waves are reflected back to the ultrasonic sensor. The hearing application 103 uses the return time of the sound wave to measure the distance between the hearing aid and the mobile device.

Radar can be used to measure a distance to an object using a transmitter that generates high-frequency electromagnetic waves, one or more antennas that transmit the electromagnetic wave and receive the wave, and a receiver that can be used to measure a distance to an object. The antenna transmits the electromagnetic wave until it hits an object. The wave is reflected back and detected by the antenna and used to determine the distance and the angle of the object.

An inductive proximity sensor can be used to measure a distance to an object. The inductive proximity sensor includes a coil and oscillator that create an electromagnetic field. When a metallic object (i.e., a mobile device) enters the operating area it causes a dampening of the oscillation amplitude. The rise or fall of the oscillation amplitude is identified by a threshold circuit that changes the output of the sensor. The distance between the inductive proximity sensor and the mobile device is based on the sensitivity of the inductive proximity sensor to different metals. The inductive proximity sensor may be as small as 3-5 millimeters.

A photoelectric sensor can be used to measure a distance to an object by emitting a beam of light that is used to detect the presence or absence of items and equipment or changes in surface conditions. When the emitted light is interrupted or reflected by the object, the change in light patterns is measured by a receiver and the target object or surface is recognized.

The storage device 251 stores data related to the hearing application 103. For example, the storage device 251 may store hearing profiles generated by the hearing application 103, sets of test sounds for testing speech, sets of test sounds for testing music, etc.

The hearing application 103 is stored in the memory 237. In some embodiments, the hearing aids 120 generate a hearing test that includes instructions for how to modify sound based on different factors, such as frequencies, types of sounds, etc.

In some embodiments, the hearing application 103 receives sensor data that is associated with a mobile device from the sensor set 249. For example, the sensor data may include sensor data from an ultrasonic sensor about the return time it took a sound wave to be reflected off the mobile device, sensor data from radar about the time taken for the electromagnetic wave to be reflected off the mobile device, sensor data from the inductive proximity sensor indicating that the mobile device is within the operating area, or sensor data from the photoelectric sensor about the time it took light to be reflected off the mobile device.

Figure 3:
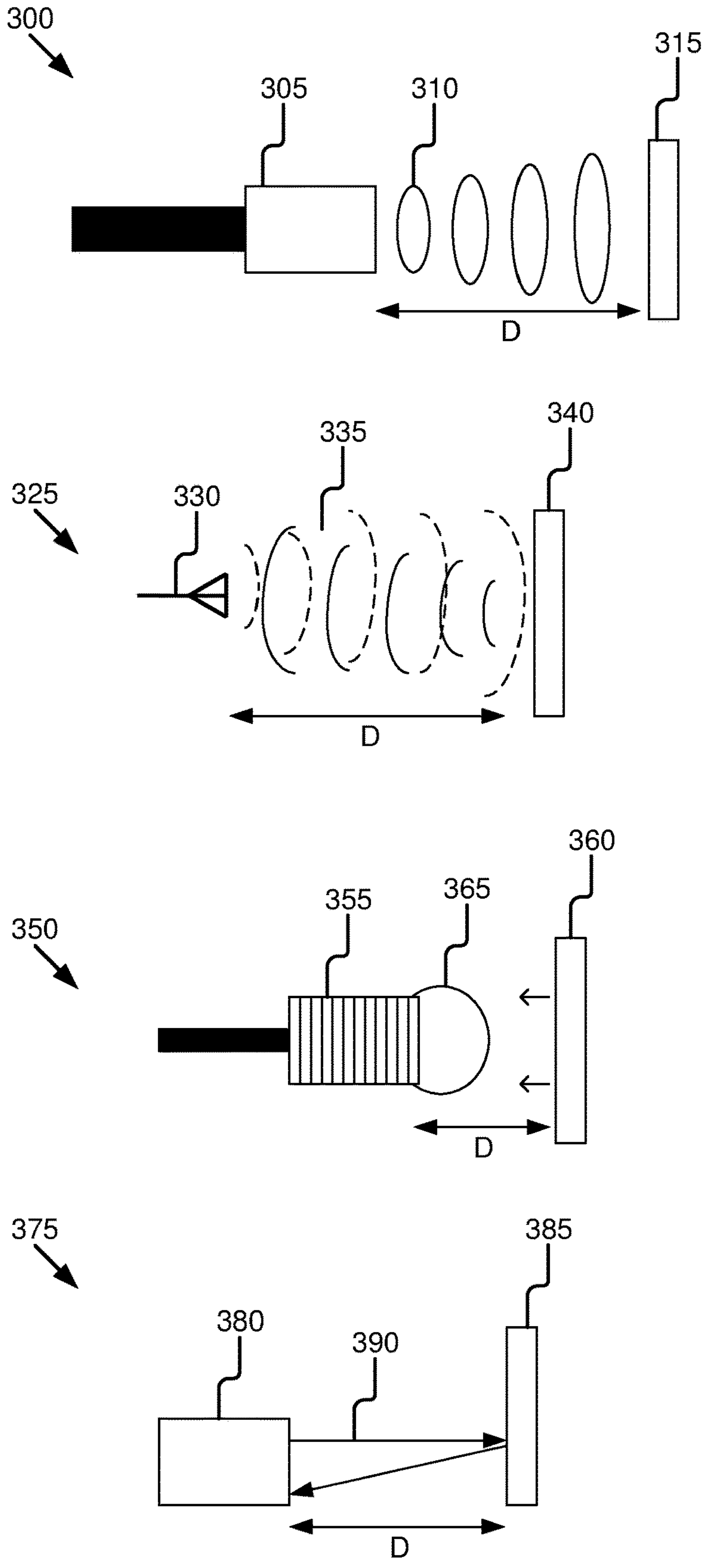
FIG. 3 includes illustrations of how different sensors are used to determine a distance between a hearing aid and a mobile device according to some embodiments described herein.

The hearing application 103 determines, based on the sensor data, a first distance between the first hearing aid and the mobile device. Turning to FIG. 3, different sensors are illustrated to show how the sensor data is used to determine a distance between a hearing aid and a mobile device.

In a first example 300, the ultrasonic sensor 305 emits high-frequency sound waves 310 that reach the mobile device 315. When the sound waves 310 reach the mobile device 315, the sound waves 310 are reflected back to the ultrasonic sensor 305. The hearing application 103 uses a time of flight equation to calculate the distance (D) as $\frac{1}{2} \times T \times C$, where T is the time between the emission and reception and C is the sonic speed.

In a second example 325, the radar includes an antenna 330 that transmits the electromagnetic waves 335 that reach the mobile device 340. The antenna transmits the electromagnetic wave until it hits an object. The electromagnetic waves 335 are reflected back (as illustrated by dashed lines) and detected by the antenna 330. The hearing application 103 calculates the distance (D) as $v \times t$ where v is the speech of light (300,000 km/s) and t is time. In some embodiments, the hearing application 103 uses radar to determine the angle of the mobile device 340.

In a third example 350, the inductive proximity sensor 355 can be used to measure a distance to an object. The inductive proximity sensor 355 includes a coil and oscillator that create an electromagnetic field 365. When the mobile device 360 enters the operating area it causes a dampening of the oscillation amplitude. The distance between the inductive proximity sensor 355 and the mobile device 360 is based on the sensitivity of the inductive proximity sensor 355 to different metals.

In a fourth example 375, a photoelectric sensor 380 can be used to measure a distance to the mobile device 385 by emitting a beam of light 390 that is used to detect the presence of the mobile device 385. The beam of light 390 is reflected by the mobile device 385 and the change in light patterns is measured by a receiver that is also part of the photoelectric sensor 380 and the target object or surface is recognized. The hearing application 103 may use a time of flight equation to determine the distance (D).

The hearing application 103 determines, that the first distance between the first hearing aid and the mobile device is below a first distance threshold. The first distance threshold indicates that the mobile device is close enough to the first hearing aid that a preset should be changed. In some embodiments, the first distance threshold is a default setting, such as six inches, two inches, etc. In some embodiments, the user may specify the first distance threshold.

In some embodiments, the hearing application 103 generates a confidence score that determines a likelihood that the mobile device is within proximity to the first hearing aid. The hearing application 103 may not change from a first preset to a second preset unless the confidence score meets a threshold score.

The hearing application 103 changes a first preset associated with the first hearing aid to a second preset. For example, the first preset associated with the first hearing aid is an ambient noise setting that allows the user to hear any noises and adjusts the sounds based on the hearing profile and the second preset is a mix of ambient noise and noise cancellation that amplifies voices and reduces background noise. The first preset may also be referred to as transparency mode, which allows a user to hear all background noises in an environment including ambient noises. The second preset may also include adjustments based on the hearing profile, such as increasing the gain for frequencies where the user experiences hearing loss.

In some embodiments, the mix of ambient noise and noise cancellation includes different types of noise cancellation settings. For example, the noise cancellation could include active cancellation where the microphones and speakers are used to reduce background and surrounding noises; adaptive noise cancellation where the microphones and speakers are used to automatically adjust to the surroundings; transparency mode; or noise cancellation is mixed with ambient sound so that voices are amplified, but not all noises are blocked.

In some embodiments, the first preset includes a far-field microphone setting and the second preset includes a near-field microphone setting. A far-field microphone setting is designed for a microphone to capture noise from larger distances, such as 15 feet or more. A near-field microphone setting is designed for a microphone to capture noise that is closer to the microphone and therefore works best when a user is conducting a phone conversation because it reduces instances where the microphone detects sounds that are farther away.

The hearing application 103 may determine, based on the sensor data, a second distance between the second hearing aid and the mobile device. The hearing application 103 may determine that the second distance between the second hearing aid and the mobile device exceeds the first distance threshold and is below a second distance threshold. For example, the second distance may be between two inches and 10 inches. This occurs, for example, where the user puts the mobile device against the ear that has the first hearing aid.

The hearing application 103 changes a first preset associated with the second hearing aid to a third preset. For example, the first preset is an ambient noise setting and the third preset is for noise cancellation. This change advantageously allows the user to hear the phone call using the mobile device in one ear while blocking noise in the other ear to improve the user's ability to focus on the phone call.

In some embodiments, the hearing application 103 subsequently determines that the first distance between the first hearing aid and the mobile device meets the distance threshold. For example, the user moves the phone away from the user's ear because they have completed a phone call or to briefly speak to someone. The hearing application 103 changes the second preset associated with the first hearing aid to the first preset. For example, the hearing application 103 changes the preset from the mix of ambient noise and noise cancellation back to the ambient noise setting.

In some embodiments, the hearing application 103 determines that the second distance between the second hearing aid and the mobile device is below the distance threshold. For example, instead of ending the phone call, the user may switch the phone from being next to the first hearing aid to being next to the second hearing aid. The hearing application 103 changes the third preset associated with the second hearing aid to the second preset. For example, the hearing application 103 changes from noise cancellation to the mix of ambient noise and noise cancellation.

Figure 4:
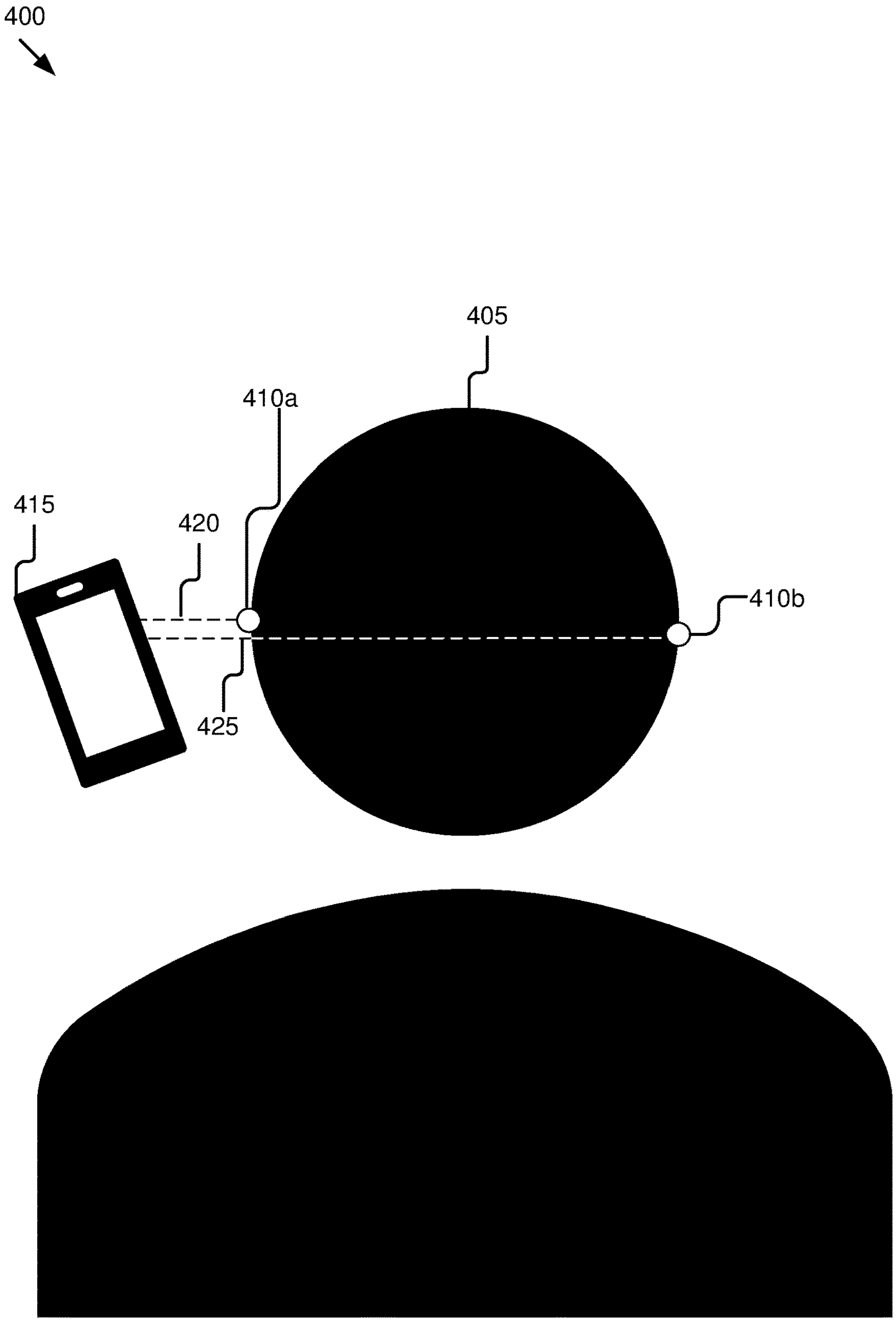
FIG. 4 is an illustration of a user with hearing aids and a mobile device according to some embodiments described herein.

Turning to FIG. 4, a user 405 with hearing aids 410 and a mobile device 415 is illustrated. As the user 405 moves the mobile device 415 to be closer to the first hearing aid 410*a*, the hearing application determines whether the first distance 420 between the first hearing aid 410*a* and the mobile device 415 is less than a first distance threshold. Once the first distance 420 is less than the first distance threshold, the first hearing aid 410*a* changes from a first preset to a second preset.

The second hearing aid 410*b* determines whether the second distance 425 between the second hearing aid 410*b* and the mobile device 415 meets the first distance threshold and is less than a second distance threshold. If the second distance 425 is between the first distance threshold and the second distance threshold, the second hearing aid 410*b* changes from the first preset to a third preset.

Example Methods

Figure 5:
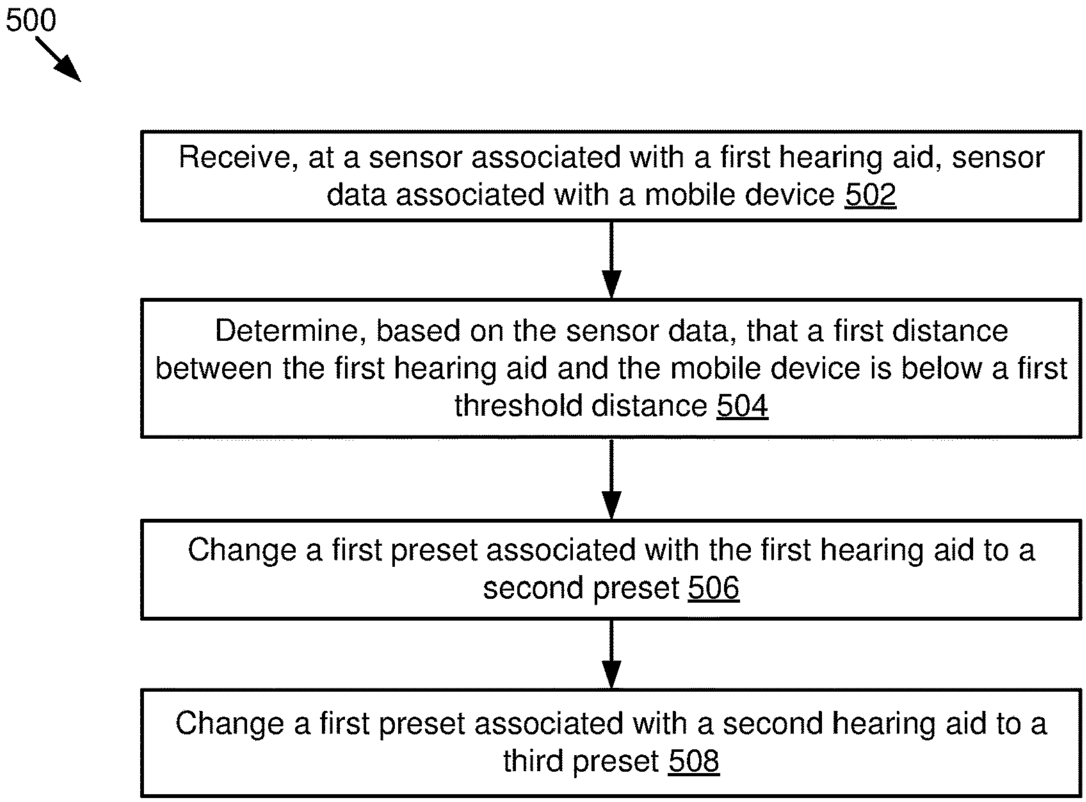
FIG. 5 illustrates a flowchart of a method to determine a distance between a hearing aid and a mobile device according to some embodiments described herein.

FIG. 5 illustrates a flowchart of a method 500 to determine a distance between a hearing aid and a mobile device. The method 500 may be performed by the computing device 200 in FIG. 2. For example, the computing device 200 may be the hearing aids 120 illustrated in FIG. 1. The computing device 200 includes a hearing application 103 that implements the steps described below.

The method 500 may begin at block 502. At block 502, a first sensor associated with a first hearing device receives sensor data associated with a mobile device. For example, the sensor data may include sound waves generated by an ultrasonic sensor that are reflected by the mobile device, a high-frequency electromagnetic wave pulse generated by radar that is reflected by the mobile device, detection that the mobile device is within proximity to an electromagnetic field generated by an inductive proximity sensor, or light generated by a photoelectric sensor that is reflected by the mobile device. Block 502 may be followed by block 504.

At block 504, it is determined, based on the sensor data, that a first distance between the first hearing aid and the mobile device is below a first distance threshold. Block 504 may be followed by block 506.

At block 506, a first preset associated with the first hearing aid is changed to a second preset. For example, the first preset may be changed from an ambient noise setting and a far-field microphone setting to a mix of ambient noise and noise cancellation and a near-field microphone setting. Block 506 may be followed by block 508.

At block 508, a first preset associated with a second hearing aid is changed to a third preset. For example, the first preset may be changed from an ambient noise setting to noise cancellation.

Figure 6:
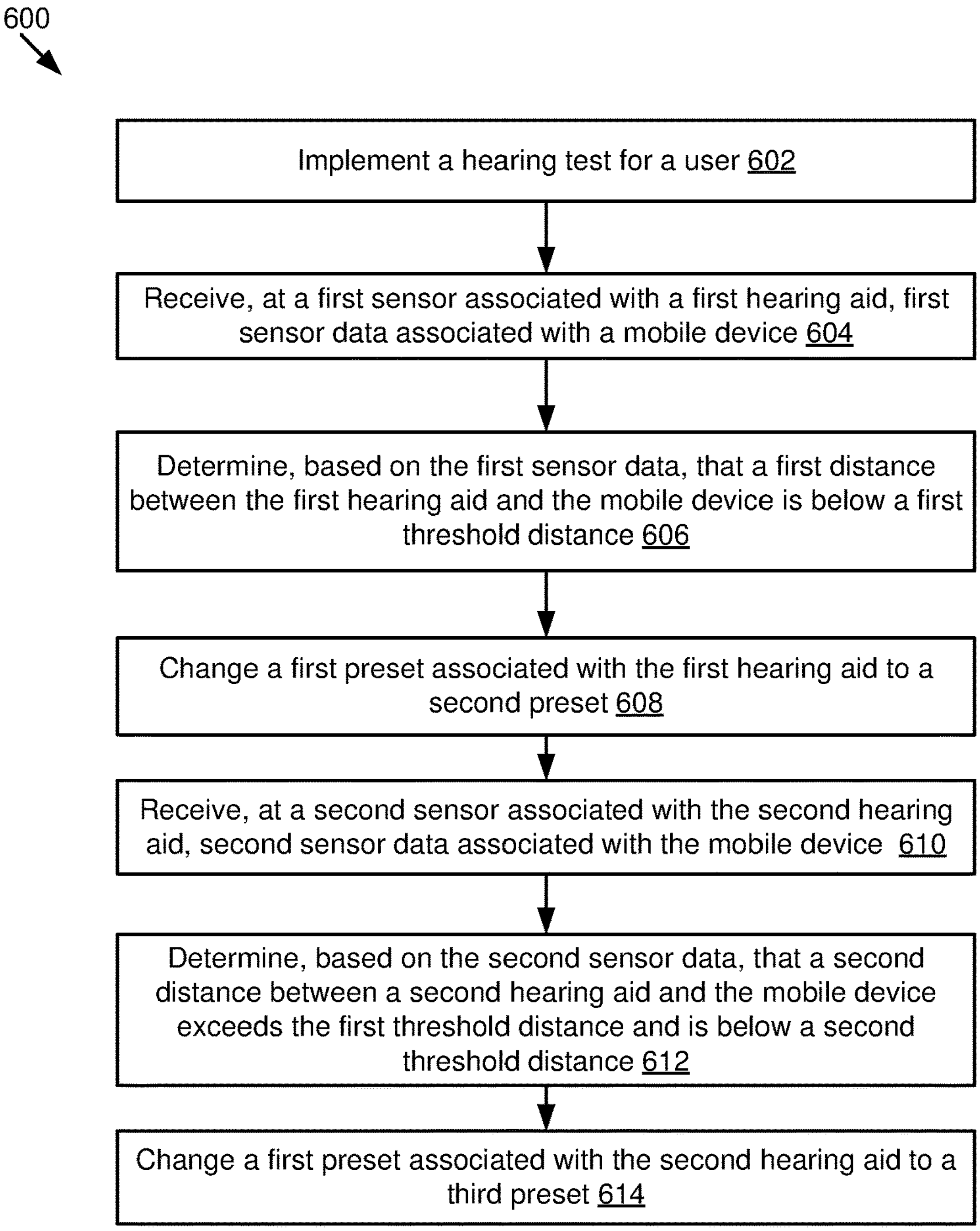
FIG. 6 illustrates a flowchart of another method to determine a distance between a hearing aid and a mobile device according to some embodiments described herein.

FIG. 6 illustrates a flowchart of another method to determine a distance between a hearing aid and a mobile device. The method 600 may be performed by the computing device 200 in FIG. 2. For example, the computing device 200 may be the hearing aids 120 illustrated in FIG. 1. The computing device 200 includes a hearing application 103 that implements the steps described below.

At block 602, a hearing test is implemented for a user. For example, the hearing aids play test sounds at different decibel levels until the user identifies that they can detect the test sounds. Block 602 may be followed by block 604.

At block 604, a first sensor associated with a first hearing aid receives first sensor data associated with a mobile device. Block 604 may be followed by block 606.

At block 606, it is determined, based on the first sensor data, that a first distance between the first hearing aid and the mobile device is below a first distance threshold. For example, the user may be moving the mobile phone to their first ear to take a phone call. Block 606 may be followed by block 608.

At block 608, a first preset associated with the first hearing aid is changed to a second preset. For example, the first preset is designed for hearing ambient noises in a room as modified for the user based on the hearing test. The second preset may be designed for adding gain to voices so the user can hear the phone call better. Block 608 may be followed by block 610.

At block 610, a second sensor associated with the second hearing aid may receive second sensor data associated with the mobile device. Block 610 may be followed by block 612.

At block 612, it is determined, based on the second sensor data, that a second distance between a second hearing aid and the mobile device exceeds the first distance threshold and is below a second distance threshold. For example, the second hearing aid may determine that the mobile device is within sensing proximity, but is closer to the first ear. Block 612 may be followed by block 614.

At block 614, a first preset associated with the second hearing aid is changed to a third preset. For example, the first preset is designed for hearing ambient noises in a room as modified for the user based on the hearing test. The third preset may be designed for cancelling all noises so that the user can better hear the voices during the phone call.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end mobile devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method comprising:

receiving, at a first sensor associated with a first hearing aid, first sensor data associated with a mobile device;

determining, based on the first sensor data, that a first distance between the first hearing aid and the mobile device is below a first distance threshold;

changing a first preset associated with the first hearing aid to a second preset, wherein the first preset associated with the first hearing aid is an ambient noise setting and the second preset is a mix of ambient noise and noise cancellation that amplifies voices and reduces background noise; and changing a first preset associated with a second hearing aid to a third preset.

2. The method of claim 1, wherein the first preset associated with the first hearing aid includes a far-field microphone setting and the second preset includes a near-field microphone setting.

3. The method of claim 1, further comprising:

receiving, at a second sensor associated with the second hearing aid, second sensor data associated with the mobile device; and determining, based on the second sensor data, that a second distance between the second hearing aid and the mobile device exceeds the first distance threshold and is below a second distance threshold, wherein changing the first preset associated with the second hearing aid occurs responsive to the determining.

4. The method of claim 3, wherein the first preset associated with the second hearing aid is an ambient noise setting and the third preset is noise cancellation.

5. The method of claim 3, further comprising:

determining that the first distance between the first hearing aid and the mobile device meets the first distance threshold; and changing the second preset associated with the first hearing aid to the first preset.

6. The method of claim 5, further comprising:

determining that the second distance between the second hearing aid and the mobile device is below the first distance threshold; and changing the third preset associated with the second hearing aid to the second preset.

7. The method of claim 1, wherein the first sensor is selected from a group of an ultrasonic sensor, radar, an inductive proximity sensor, a photoelectric sensor, and combinations thereof.

8. A system comprising:

a first hearing aid that includes one or more first processors and first logic encoded in one or more first non-transitory media for execution by the one or more first processors and when executed operable to:

receive first sensor data associated with a mobile device;

determine, based on the first sensor data, that a first distance between the first hearing aid and the mobile device is below a first distance threshold; and change a first preset associated with the first hearing aid to a second preset, wherein the first preset associated with the first hearing aid is an ambient noise setting and the second preset is a mix of ambient noise and noise cancellation that amplifies voices and reduces background noise;

a second hearing aid that includes one or more second processors and second logic encoded in one or more second non-transitory media for execution by the one or more first processors and when executed operable to:

change a first preset associated with a second hearing aid to a third preset.

9. The system of claim 8, wherein the first preset associated with the first hearing aid includes a far-field microphone setting and the second preset includes a near-field microphone setting.

10. The system of claim 8, wherein the second logic is further operable to:

receive second sensor data associated with the mobile device; and determine based on the second sensor data, that a second distance between the second hearing aid and the mobile device exceeds the first distance threshold and is below a second distance threshold, wherein changing the first preset associated with the second hearing aid occurs.

11. The system of claim 10, wherein the first preset associated with the second hearing aid is an ambient noise setting and the third preset is noise cancellation.

12. The system of claim 10, wherein the first logic is further operable to:

determine that the first distance between the first hearing aid and the mobile device meets the first distance threshold; and change the second preset associated with the first hearing aid to the first preset.

13. The system of claim 12, wherein the second logic is further operable to:

determine that the second distance between the second hearing aid and the mobile device is below the first distance threshold; and change the third preset associated with the second hearing aid to the second preset.

* * * * *